(12) United States Patent
Bourilkov et al.

(10) Patent No.: US 9,634,495 B2
(45) Date of Patent: Apr. 25, 2017

(54) WIRELESS POWER TRANSFER USING SEPARATELY TUNABLE RESONATORS

(71) Applicant: DURACELL U.S. OPERATIONS, INC., Wilmington, DE (US)

(72) Inventors: Jordan Todorov Bourilkov, Bethany, CT (US); Steven Jeffrey Specht, Brookfield, CT (US); Sergio Coronado Hortal, Bethel, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 153 days.

(21) Appl. No.: 14/551,196

(22) Filed: Nov. 24, 2014

(65) Prior Publication Data
US 2015/0084429 A1 Mar. 26, 2015

Related U.S. Application Data

(63) Continuation of application No. 13/367,443, filed on Feb. 7, 2012, now Pat. No. 8,933,589.

(51) Int. Cl.
*H02J 5/00* (2016.01)
*H02J 7/02* (2016.01)

(52) U.S. Cl.
CPC .............. *H02J 5/005* (2013.01); *H02J 7/025* (2013.01)

(58) Field of Classification Search
CPC .................................................... H02J 7/025
USPC ........................................................ 307/104
See application file for complete search history.

(56) References Cited

U.S. PATENT DOCUMENTS

| 645,576 | A | 3/1900 | Tesla |
| 649,621 | A | 5/1900 | Tesla |
| 787,412 | A | 4/1905 | Tesla |
| 1,119,732 | A | 12/1914 | Tesla |
| 5,982,139 | A | 11/1999 | Parise |

(Continued)

FOREIGN PATENT DOCUMENTS

| CN | 101842962 A | 9/2010 |
| EP | 2056426 A2 | 5/2009 |

(Continued)

OTHER PUBLICATIONS

PCT International Search Report with Written Opinion in corresponding International application No. PCT/US2013/025065 dated Jul. 10, 2013.

*Primary Examiner* — Robert Deberadinis
(74) *Attorney, Agent, or Firm* — Marshall, Gerstein & Borun LLP

(57) ABSTRACT

A system for wireless energy transfer includes a circuit for wireless transmission of energy, including a first, tunable resonator circuit including a transmitter coil and a variable capacitance device connected in shunt across the transmitter coil. Also disclosed is a circuit for wireless reception of energy including a tunable second resonator circuit including a receiver coil inductively coupled to the transmitter coil and a variable capacitance device connected in shunt across the receiver coil. Also disclosed is an arrangement for wireless energy transmission and reception that foregoes the necessity for separate circuits for DC rectification at the reception end of the arrangement. Also disclosed a system for wireless energy transfer where the system includes a tunable resonator circuit embedded in a surface such as piece of furniture, counter, etc., e.g., a table.

9 Claims, 5 Drawing Sheets

(56) References Cited

U.S. PATENT DOCUMENTS

| | | | |
|---|---|---|---|
| 6,114,834 A | 9/2000 | Parise | |
| 6,289,237 B1 | 9/2001 | Mickle et al. | |
| 6,437,685 B2 | 8/2002 | Hanaki | |
| 6,615,074 B2 | 9/2003 | Mickle et al. | |
| 6,792,259 B1 | 9/2004 | Parise | |
| 6,856,291 B2 | 2/2005 | Mickle et al. | |
| 6,960,968 B2 | 11/2005 | Odendaal et al. | |
| 6,967,462 B1 | 11/2005 | Landis | |
| 7,027,311 B2 | 4/2006 | Vanderelli et al. | |
| 7,057,514 B2 | 6/2006 | Mickle et al. | |
| 7,068,991 B2 | 6/2006 | Parise | |
| 7,084,605 B2 | 8/2006 | Mickle et al. | |
| 7,373,133 B2 | 5/2008 | Mickle et al. | |
| 7,383,064 B2 | 6/2008 | Mickle et al. | |
| 7,403,803 B2 | 7/2008 | Mickle et al. | |
| 7,440,780 B2 | 10/2008 | Mickle et al. | |
| 7,443,057 B2 | 10/2008 | Nunelly | |
| 7,528,698 B2 | 5/2009 | Mickle et al. | |
| 7,567,824 B2 | 7/2009 | Mickle et al. | |
| 7,639,994 B2 | 12/2009 | Greene et al. | |
| 7,643,312 B2 | 1/2010 | Vanderelli et al. | |
| 7,706,771 B2 | 4/2010 | Rofougaran | |
| 7,741,734 B2 | 6/2010 | Joannopoulos et al. | |
| 7,825,543 B2 | 11/2010 | Karalis et al. | |
| 7,843,288 B2 | 11/2010 | Lee et al. | |
| 7,844,306 B2 | 11/2010 | Shearer et al. | |
| 7,880,337 B2 | 2/2011 | Farkas | |
| 7,893,564 B2 | 2/2011 | Bennett | |
| 7,898,105 B2 | 3/2011 | Greene et al. | |
| 7,919,886 B2 | 4/2011 | Tanaka | |
| 7,925,308 B2 | 4/2011 | Greene et al. | |
| 8,482,157 B2 * | 7/2013 | Cook | H01Q 7/00 307/104 |
| 2006/0238365 A1 | 10/2006 | Vecchione et al. | |
| 2007/0178945 A1 | 8/2007 | Cook et al. | |
| 2007/0222542 A1 | 9/2007 | Joannopoulos et al. | |
| 2008/0014897 A1 | 1/2008 | Cook et al. | |
| 2008/0211320 A1 | 9/2008 | Cook et al. | |
| 2008/0278264 A1 | 11/2008 | Karalis et al. | |
| 2009/0015075 A1 | 1/2009 | Cook et al. | |
| 2009/0033564 A1 | 2/2009 | Cook et al. | |
| 2009/0045773 A1 | 2/2009 | Pandya et al. | |
| 2009/0051224 A1 | 2/2009 | Cook et al. | |
| 2009/0058189 A1 | 3/2009 | Cook et al. | |
| 2009/0072628 A1 | 3/2009 | Cook et al. | |
| 2009/0072629 A1 | 3/2009 | Cook et al. | |
| 2009/0079268 A1 | 3/2009 | Cook et al. | |
| 2009/0102292 A1 | 4/2009 | Cook et al. | |
| 2009/0108679 A1 | 4/2009 | Porwal | |
| 2009/0127937 A1 | 5/2009 | Cook et al. | |
| 2009/0134712 A1 | 5/2009 | Cook et al. | |
| 2009/0153273 A1 | 6/2009 | Chen et al. | |
| 2009/0160261 A1 | 6/2009 | Elo | |
| 2009/0195332 A1 | 8/2009 | Joannopoulos et al. | |
| 2009/0195333 A1 | 8/2009 | Joannopoulos et al. | |
| 2009/0212636 A1 | 8/2009 | Cook et al. | |
| 2009/0213028 A1 | 8/2009 | Cook et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2009/0284082 A1 | 11/2009 | Mohammadian | |
| 2009/0284083 A1 | 11/2009 | Karalis et al. | |
| 2009/0284218 A1 | 11/2009 | Mohammadian et al. | |
| 2009/0284220 A1 | 11/2009 | Toncich et al. | |
| 2009/0284227 A1 | 11/2009 | Mohammadian et al. | |
| 2009/0284245 A1 | 11/2009 | Kirby et al. | |
| 2009/0284369 A1 | 11/2009 | Toncich et al. | |
| 2009/0286470 A1 | 11/2009 | Mohammadian et al. | |
| 2009/0286475 A1 | 11/2009 | Toncich et al. | |
| 2009/0286476 A1 | 11/2009 | Toncich et al. | |
| 2009/0289595 A1 | 11/2009 | Chen et al. | |
| 2009/0299918 A1 | 12/2009 | Cook et al. | |
| 2010/0034238 A1 | 2/2010 | Bennett | |
| 2010/0036773 A1 | 2/2010 | Bennett | |
| 2010/0052431 A1 | 3/2010 | Mita | |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0109443 A1 | 5/2010 | Cook et al. |
| 2010/0109445 A1 | 5/2010 | Kurs et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0148918 A1 | 6/2010 | Gerner et al. |
| 2010/0151808 A1 | 6/2010 | Toncich et al. |
| 2010/0164295 A1 | 7/2010 | Ichikawa et al. |
| 2010/0164296 A1 | 7/2010 | Kurs et al. |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0171371 A1 | 7/2010 | Kriuk et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0184371 A1 | 7/2010 | Cook et al. |
| 2010/0187911 A1 | 7/2010 | Joannopoulos et al. |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201205 A1 | 8/2010 | Karalis et al. |
| 2010/0201310 A1 | 8/2010 | Vorenkamp et al. |
| 2010/0201311 A1 | 8/2010 | Lyell Kirby et al. |
| 2010/0201312 A1 | 8/2010 | Kirby et al. |
| 2010/0201313 A1 | 8/2010 | Vorenkamp et al. |
| 2010/0201314 A1 | 8/2010 | Toncich et al. |
| 2010/0201533 A1 | 8/2010 | Kirby et al. |
| 2010/0207458 A1 | 8/2010 | Joannopoulos et al. |
| 2010/0207572 A1 | 8/2010 | Kirby et al. |
| 2010/0207575 A1 | 8/2010 | Pijnenburg et al. |
| 2010/0207822 A1 | 8/2010 | Sotoudeh |
| 2010/0210233 A1 | 8/2010 | Cook et al. |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0237096 A1 | 9/2010 | Wegelin |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |

(56) References Cited

U.S. PATENT DOCUMENTS

| | | |
|---|---|---|
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244839 A1 | 9/2010 | Yoshikawa |
| 2010/0248622 A1 | 9/2010 | Lyell Kirby et al. |
| 2010/0253152 A1 | 10/2010 | Karalis et al. |
| 2010/0253281 A1 | 10/2010 | Li |
| 2010/0256831 A1 | 10/2010 | Abramo |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0259111 A1 | 10/2010 | Ruocco |
| 2010/0259447 A1 | 10/2010 | Crouch |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0279606 A1 | 11/2010 | Hillan et al. |
| 2010/0289331 A1 | 11/2010 | Shionoiri et al. |
| 2010/0289341 A1 | 11/2010 | Ozaki et al. |
| 2010/0289449 A1 | 11/2010 | Elo |
| 2010/0295506 A1 | 11/2010 | Ichikawa |
| 2010/0301678 A1 | 12/2010 | Kim et al. |
| 2010/0308939 A1 | 12/2010 | Kurs |
| 2010/0323616 A1 | 12/2010 | Von Novak et al. |
| 2010/0327660 A1 | 12/2010 | Karalis et al. |
| 2010/0327661 A1 | 12/2010 | Karalis et al. |
| 2011/0012431 A1 | 1/2011 | Karalis et al. |
| 2011/0018361 A1 | 1/2011 | Karalis et al. |
| 2011/0018679 A1 | 1/2011 | Davis et al. |
| 2011/0025133 A1 | 2/2011 | Sauerlaender et al. |
| 2011/0031821 A1 | 2/2011 | Greene et al. |
| 2011/0037322 A1 | 2/2011 | Kanno |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0043163 A1 | 2/2011 | Baarman et al. |
| 2011/0043327 A1 | 2/2011 | Baarman et al. |
| 2011/0049996 A1 | 3/2011 | Karalis et al. |
| 2011/0049998 A1 | 3/2011 | Karalis et al. |
| 2011/0050166 A1 | 3/2011 | Cook et al. |
| 2011/0053500 A1 | 3/2011 | Menegoli et al. |
| 2011/0056215 A1 | 3/2011 | Ham et al. |
| 2011/0057606 A1 | 3/2011 | Saunamaki |
| 2011/0057607 A1 | 3/2011 | Carobolante |
| 2011/0057891 A1 | 3/2011 | Ham et al. |
| 2011/0062791 A1 | 3/2011 | Shearer et al. |
| 2011/0062796 A1 | 3/2011 | Farahani |
| 2011/0062916 A1 | 3/2011 | Farahani |
| 2011/0065383 A1 | 3/2011 | Frankland et al. |
| 2011/0080050 A1 | 4/2011 | Thundat et al. |
| 2011/0080051 A1 | 4/2011 | Lee et al. |
| 2011/0080052 A1 | 4/2011 | Sato |
| 2011/0080053 A1 | 4/2011 | Urano |
| 2011/0080054 A1 | 4/2011 | Urano |
| 2011/0081857 A1 | 4/2011 | Lee et al. |
| 2011/0089895 A1 | 4/2011 | Karalis et al. |
| 2011/0095617 A1 | 4/2011 | Cook et al. |
| 2011/0095618 A1 | 4/2011 | Schatz et al. |
| 2011/0095619 A1 | 4/2011 | Urano |
| 2011/0101788 A1 | 5/2011 | Sun et al. |
| 2011/0101791 A1 | 5/2011 | Urano |
| 2011/0109167 A1 | 5/2011 | Park et al. |
| 2011/0109262 A1 | 5/2011 | Iizuka et al. |
| 2011/0115303 A1 | 5/2011 | Baarman et al. |
| 2011/0115430 A1 | 5/2011 | Saunamaki |
| 2011/0115431 A1 | 5/2011 | Dunworth et al. |
| 2011/0115432 A1 | 5/2011 | El-Maleh et al. |
| 2011/0119135 A1 | 5/2011 | Grilli et al. |
| 2011/0119144 A1 | 5/2011 | Grilli et al. |
| 2011/0121658 A1 | 5/2011 | Fukada |
| 2011/0121778 A1 | 5/2011 | Oyobe et al. |
| 2011/0121920 A1 | 5/2011 | Kurs et al. |
| 2011/0124305 A1 | 5/2011 | Von Novak et al. |
| 2011/0127843 A1 | 6/2011 | Karaoguz et al. |
| 2011/0127848 A1 | 6/2011 | Ryu et al. |
| 2011/0127951 A1 | 6/2011 | Walley et al. |
| 2011/0127952 A1 | 6/2011 | Walley et al. |
| 2011/0127953 A1 | 6/2011 | Walley et al. |
| 2011/0127954 A1 | 6/2011 | Walley et al. |
| 2011/0130093 A1 | 6/2011 | Walley et al. |
| 2011/0133564 A1 | 6/2011 | Teo et al. |
| 2011/0133565 A1 | 6/2011 | Teo et al. |
| 2011/0133566 A1 | 6/2011 | Teo et al. |
| 2011/0133567 A1 | 6/2011 | Teo et al. |
| 2011/0133568 A1 | 6/2011 | Wang et al. |
| 2011/0133569 A1 | 6/2011 | Cheong et al. |
| 2011/0140543 A1 | 6/2011 | Ryu et al. |
| 2011/0140544 A1 | 6/2011 | Karalis et al. |
| 2011/0140807 A1 | 6/2011 | Ryu et al. |
| 2011/0140809 A1 | 6/2011 | Ryu et al. |
| 2011/0148215 A1 | 6/2011 | Marzetta et al. |
| 2011/0148219 A1 | 6/2011 | Karalis et al. |
| 2011/0148347 A1 | 6/2011 | Greene et al. |
| 2011/0148349 A1 | 6/2011 | Kim et al. |
| 2011/0148351 A1 | 6/2011 | Ichikawa |
| 2011/0156486 A1 | 6/2011 | Teo et al. |
| 2011/0156487 A1 | 6/2011 | Teo et al. |
| 2011/0156490 A1 | 6/2011 | Hwang et al. |
| 2011/0156491 A1 | 6/2011 | Kim et al. |
| 2011/0156492 A1 | 6/2011 | Ryu et al. |
| 2011/0156493 A1 | 6/2011 | Bennett |
| 2011/0156635 A1 | 6/2011 | Hong et al. |
| 2011/0156639 A1 | 6/2011 | Ryu et al. |
| 2011/0159812 A1 | 6/2011 | Kim et al. |
| 2011/0162895 A1 | 7/2011 | Karalis et al. |
| 2011/0163542 A1 | 7/2011 | Farkas |
| 2011/0163608 A1 | 7/2011 | Brohlin et al. |
| 2011/0163609 A1 | 7/2011 | Wada et al. |
| 2011/0164471 A1 | 7/2011 | Baarman et al. |
| 2011/0266878 A9 | 11/2011 | Cook et al. |
| 2012/0306265 A1 | 12/2012 | Yamamoto et al. |
| 2013/0119930 A1 | 5/2013 | Sakoda et al. |
| 2013/0127242 A1 | 5/2013 | Ichikawa |
| 2013/0127253 A1 | 5/2013 | Stark et al. |

FOREIGN PATENT DOCUMENTS

| | | |
|---|---|---|
| EP | 2530811 A1 | 12/2012 |
| JP | 2010-183810 A | 8/2010 |
| JP | 2010-252468 A | 11/2010 |
| JP | 2010-536315 A | 11/2010 |
| JP | 2011-166994 A | 8/2011 |
| TW | 201126861 A | 8/2011 |
| WO | WO-2009/023155 A2 | 2/2009 |
| WO | WO 2010/024895 A1 | 3/2010 |
| WO | WO 2010/116441 A1 | 10/2010 |
| WO | WO 2011/061821 A1 | 5/2011 |
| WO | WO-2011/065255 | 6/2011 |
| WO | WO 2011/065352 A1 | 6/2011 |
| WO | WO 2011/070637 A1 | 6/2011 |
| WO | WO 2011/074082 A1 | 6/2011 |
| WO | WO 2011/077488 A1 | 6/2011 |
| WO | WO 2011/077493 A1 | 6/2011 |
| WO | WO 2011/081466 A2 | 7/2011 |
| WO | WO-2012/014482 A1 | 2/2012 |

* cited by examiner

WIRELESS POWER TRANSFER USING SEPARATELY TUNABLE RESONATORS

BACKGROUND

This invention relates to wireless power transfer and in particular to techniques that can be adapted for charging of batteries and the like.

Wireless power transfer is known for over 100 years. With the boom of portable electronic devices in the last decade the interest in wireless power transfer for battery charging is growing rapidly.

SUMMARY

To increase wireless power transfer system operating range, a high-Q factor system using self-resonating coils can be used. The problem with self-resonating coils is the difficulty to tune the two coils to the RF source frequency and between one another (this is done by changing the number of windings and distance between the windings and not suitable for automatic feedback control).

For practical applications such as for use in charging household appliance applications, typical short range inductive chargers are limited to several centimeters or even millimeters. High-Q factor resonant systems partially offset the rapid decay of received power vs. distance between transmitter (transmitter) and receiver (receiver), at the cost of high operating voltages across the resonant coils, as the receiver coil voltage swings up wildly when the receiver device is moved closer to the transmitter. High-Q systems have to rectify and regulate voltages in the order of hundreds and even thousands of volts. This can pose a problem for typical low-voltage operated electronic devices operating in this type of environment. High input voltage regulators exist, although they are less efficient, bulky and costly.

Inductive, e.g., battery chargers typically operate over a short spatial range, typically limited to several centimeters or even millimeters. High-Q resonant systems partially offset the rapid decay of received power vs. distance between transmitter (transmitter) and receiver (receiver). While a better Q-factor can occur in the megahertz range, e.g. 5 to 27 MHz, the performance of a typical rectifier circuit in such a range is limited by the maximum operating frequency of semiconductor devices. A conventional rectifier design may not perform satisfactorily at these high frequencies of operation. At such a high frequency, the output voltage waveform of a conventional rectifier may include ringing transients, due to parasitic inductance and capacitance resonances. These transients cause rectification efficiency losses and output signal noise. Moreover, input impedance characteristics of rectifiers change as a function of frequency and load. To reduce the impact, series resonant converters are used to regulate by varying the switching frequency and counteract the reactive impedance variations.

According to an aspect, a circuit includes a resonator circuit for wireless reception of energy, including a receiver coil having a large number of windings N1 and a variable capacitance device connect in shunt across the receiver coil with the receiver coil and the variable capacitor and intrinsic capacitance of the receiver coil forming the resonator circuit and an output coil with a low number of windings N2 compared to the number of windings N1 of the receiver coil, the output coil being inductively coupled to the receiver coil to provide power output from the circuit, with the resonator circuit having a resonant frequency in a range of about 100 kHz to 30 MHz.

The following are embodiments. The resonator circuit is tuned by the variable capacitance device to a resonant frequency within the range of 100 kHz to 30 MHz. The resonator circuit oscillates at high voltage and produces a strong magnetic field that is coupled to the secondary coil. Inductive coupling of the two coils produces an output voltage at the output coil related to $V_{L(coil)}=V_{in}*Q*N2/N1$. The circuit further includes circuitry to convert an AC voltage across the output coil to a DC voltage. The circuit further includes circuitry to convert an AC voltage across the output coil to a DC voltage, the circuitry including a capacitor connected in shunt across the secondary coil and a DC/DC converter or battery charger coupled to the capacitor. The circuit further includes a rectifier circuit connected to the output coil to convert AC voltage across the output coil to a DC voltage, the circuitry further including a capacitor connected in shunt across the secondary coil and a DC/DC converter coupled in series with the capacitor.

According to an additional aspect, a circuit includes a resonator circuit for wireless transmission of energy, the circuit including a transmitter coil having a large number of windings N1, a variable capacitance device connected in shunt across the transmitter coil with the transmitter coil and the variable capacitor and intrinsic capacitance of the transmitter coil forming the resonator circuit, and an input coil configured to be coupled to an input RF source, with the input coil having a low number of windings N2 compared to the number of windings N1 of the transmitter coil, and the input coil being inductively coupled to the transmitter coil to provide power output from the circuit with the resonator circuit having a resonant frequency in a range of about 100 kHz to 30 MHz.

The following are embodiments.

The resonator circuit is tuned by the variable capacitance device. The resonator circuit oscillates at high voltage and produces a strong magnetic field at the transmitter coil. The circuit further includes an RF source connected to the input coil. Inductive coupling of the transmitter and input coils produces an output voltage at the transmitter coil related to $V_{L(coil)}=V_{in}*Q*N1/N2$ where $V_{in}$ is related to the voltage of the RF source connected to the input coil.

According to an additional aspect, a system for wireless energy transfer includes a circuit for wireless transmission of energy, the circuit including a first resonator circuit including a transmitter coil having a large number of windings N1, a variable capacitance device connected in shunt across the transmitter coil with the transmitter coil and the variable capacitor and intrinsic capacitance of the transmitter coil forming the resonator circuit, an input coil configured to be connected to an input RF source, with the input coil having a low number of windings N2 compared to the number of windings N1 of the transmitter coil, and the input coil being inductively coupled to the transmitter coil to provide power output from the resonator circuit at a resonant frequency in a range of about 100 kHz to 30 MHz, a circuit for wireless reception of energy, the circuit includes a second resonator circuit includes a receiver coil inductively coupled to the transmitter coil, the receiver coil having a large number of windings N3, a variable capacitance device connected in shunt across the receiver coil with the receiver coil and the variable capacitor and intrinsic capacitance of the receiver coil forming the second resonator circuit, an output coil with a low number of windings N2 compared to the number of windings N1 of the receiver coil, the output coil being inductively coupled to the receiver coil to provide power output from the circuit, with the resonator circuit having a resonant frequency in a range of about 100 kHz to 30 MHz.

The following are embodiments.

The second resonator circuit is tuned by the variable capacitance device to a resonant frequency within the range of 100 kHz to 30 MHz. The circuit further includes circuitry to convert an AC voltage across the output coil to a DC voltage.

According to an additional aspect, a system for wireless energy transfer includes a circuit for wireless transmission of energy, configured to be fed by an RF source the circuit for wireless transmission including a first resonator circuit, a circuit for wireless reception of energy, from the first resonator circuit, the circuit for wireless reception including a second resonator circuit, and a circuit disposed between the circuit for wireless transmission of energy and the circuit for wireless reception of energy to inductively couple with the first and second resonator circuits to effectively produce a rectified voltage having a DC component at the circuit for wireless reception of energy.

The following are embodiments.

The circuit to inductively couple includes a tunable passive resonator disposed between the first and second resonator circuits, the tunable passive resonator including a coil having a large number of windings N1, a variable capacitance device connected in shunt across the coil with the coil and the variable capacitor and intrinsic capacitance of the coil forming the tunable resonator circuit, with the first and second resonator circuits in combination with the passive tunable resonator circuit providing at an output of the second resonator circuit a voltage having a DC component. The circuit to inductively couple includes a magnetic field transmitter operating at the first harmonic or higher harmonic of the base transmitter frequency. The first resonator further includes a transmitter coil having a large number of windings N1, a variable capacitance device connected in shunt across the transmitter coil with the transmitter coil and the variable capacitor and intrinsic capacitance of the transmitter coil forming the resonator circuit, an input coil configured to be coupled to an input RF source, with the input coil having a low number of windings N2 compared to the number of windings N1 of the transmitter coil, and the input coil being inductively coupled to the transmitter coil to provide power output from the resonator circuit at a resonant frequency in a range of about 100 kHz to 30 MHz. The second resonator further includes a receiver coil inductively coupled to the transmitter coil, the receiver coil having a large number of windings N3, a variable capacitance device connected in shunt across the receiver coil with the receiver coil and the variable capacitor and intrinsic capacitance of the receiver coil forming the second resonator circuit, an output coil with a low number of windings N2 compared to the number of windings N1 of the receiver coil, the output coil being inductively coupled to the receiver coil to provide power output from the circuit, with the resonator circuit having a resonant frequency in a range of about 100 kHz to 30 MHz According to an additional aspect, a system for wireless energy transfer includes a table, a circuit embedded in the table for wireless transmission of energy, the circuit includes a first resonator circuit including a transmitter conductor and a variable capacitance device connected in shunt across the transmitter conductor with the transmitter coil and the variable capacitor and intrinsic capacitance of the transmitter coil forming the resonator circuit.

The following are embodiments. The transmitter conductor is coupled to an input RF source to provide power output from the resonator circuit at a resonant frequency in a range of about 100 kHz to 30 MHz.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
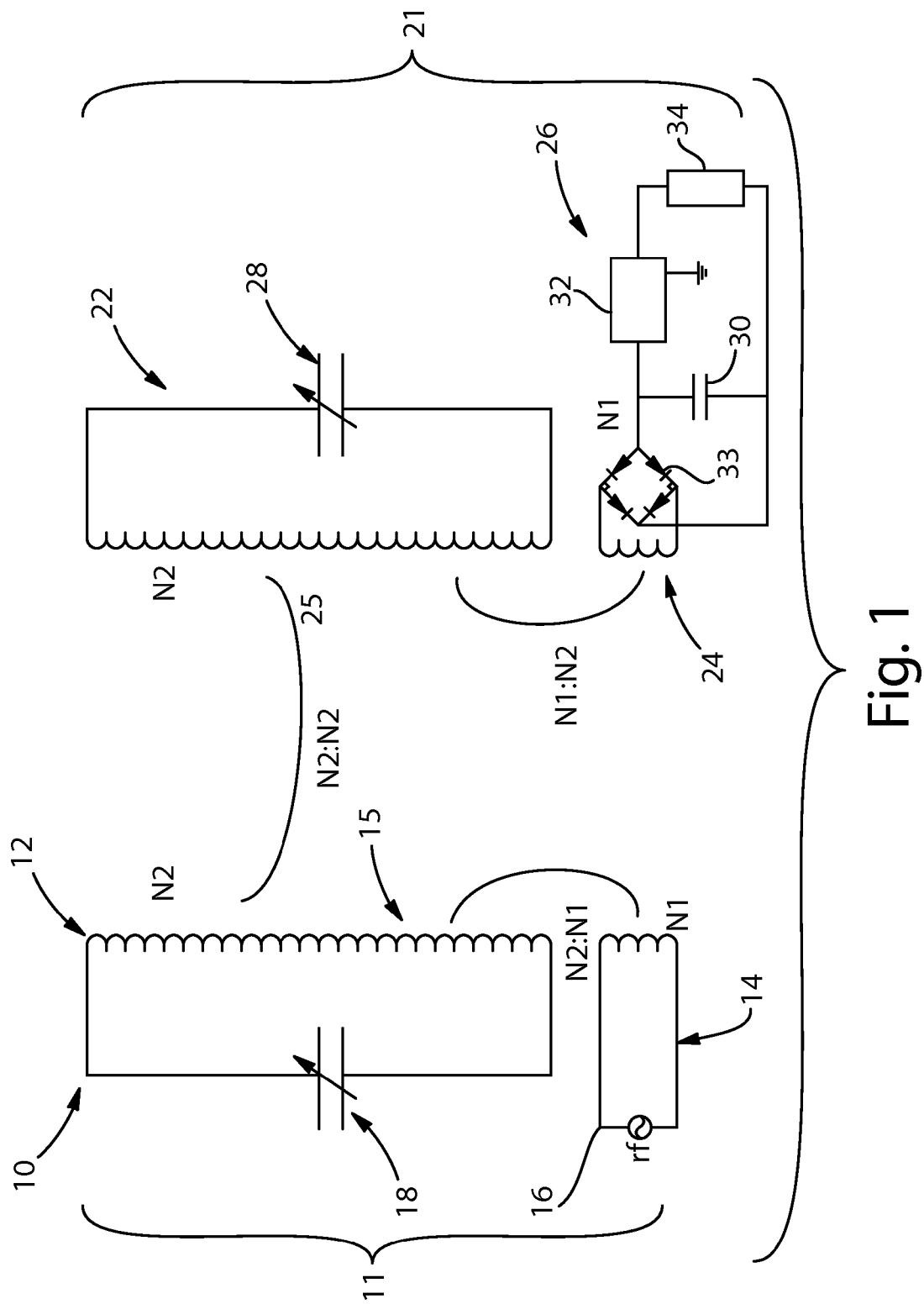
FIG. 1 is a schematic of an inductive power link employing separately tunable transmitter/receiver coils.

Referring now to FIG. 1 a wireless energy transfer arrangement 10 including a transmitter 11 and receiver 21 is shown. The transmitter 11 and receiver 21 include respective ones of tunable resonators 12, 22, respectively, for transmission and reception of wireless power. These tunable resonators 12, 22 are electrically isolated from driver electronics 16 on the transmitter side 11 and from receiver electronics 26, e.g., a rectifier circuit 32 and step-down DC/DC 34 converter on the receiver side 21.

The tunable transmitter resonator 12 includes a coil 15 (a transmitter coil) having a high number of windings N2 and a coil 14 (input coil) with a relatively low number of windings N1 where N2 is about 10 to 1000 times greater than N1. The tunable transmitter resonator 12 also includes a variable capacitance element (variable capacitor) 18 coupled in shunt across the coil 15. The variable capacitance element 18 allows the resonator 12 to be tuned, via an electrically isolated LC circuit (coil 15 and capacitor 18). The coil 15 having the relatively large number of windings N2 compared to coil 14 having windings N1. The tunable transmitter resonator 12 is fed via the input coil 14. The input coil 14 is fed an RF signal from RF source 16.

Typical bandwidth ranges, voltage ranges and power ranges are:

frequency range: 100 kHz to 30 MHz;
voltage range: 5V to 48V;
power range: 1 mW to 100 W Other ranges and sub-ranges within the above ranges, such as 5 to 27 MHz are possible.

The ratio of windings N2/N1 permits a relatively low voltage at the input coil 14 to transfer electrical energy by inductively coupling to the transmitter coil 15 and produce a very high magnetic field at transmitter coil 15. This high magnetic field inductively couples to the receiver resonator 22, as will be discussed shortly. The tunable transmitter 12 thus has a resonant structure operating at a high-voltage, producing a strong magnetic field.

A resonator is provided by use of air-core coils with an air-gap variable capacitor and variable tuning. Other configurations are possible depending on the desired properties including the bandwidth, voltage and power requirements for the tunable transmitter resonator 12. The tunable receiver resonator 22 includes a coil 25 (receiver coil) having a high number of windings N2 and a coil 24 (output coil) having a relatively low number of windings N1, where N2 is about 10 to 1000 times greater than N1. The tunable receiver resonator 22 also includes a variable capacitance element (variable capacitor) 28 coupled in shunt across the coil 25. The variable capacitance element 28 allows the resonator 22 to be tuned, via an electrically isolated LC circuit (coil 25 and capacitor 28). The coil 25 having the relatively large number of windings N2 compared to coil 24 having windings N1 permits the receiver resonator (coil 26 and capacitor 28) to efficiently couple via inductive coupling for coil 25 into the relatively high magnetic field produced by the transmitter resonator 12, producing a relatively high voltage at the coil 25. The coil 25 is inductively coupled to the coil 24.

In some embodiments, the coil 24 is magnetically shielded from the coil 15 so as not to allow significant inductive coupling between coil 15 in the transmitter and coil 24 in the receiver. Such magnetic shielding could be accomplished in various ways including placing the secondary coil within a region defined by and confined by the primary coil 25 on the receiver 21. One such arrangement to magnetically shield the coil 24 in the receiver is illustrated in FIG. 2.

Figure 2:
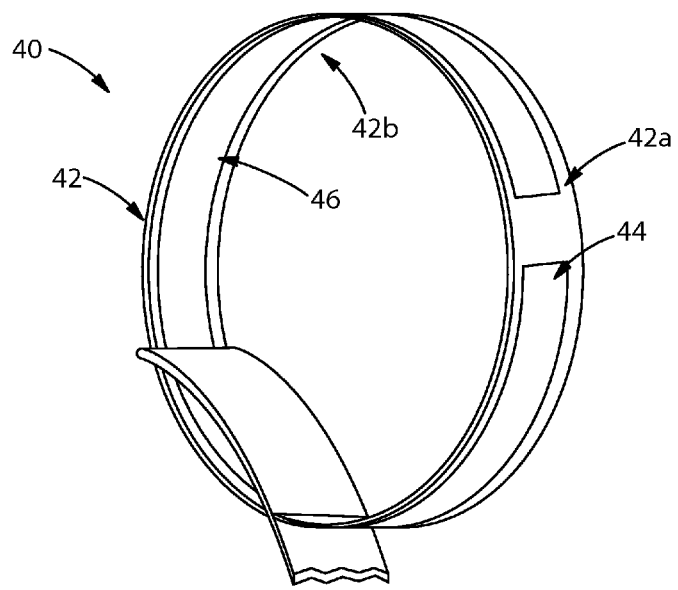
FIG. 2 is a perspective view of an embodiment of a self-shielding coil pair.

Referring now to FIG. 2 a structure 40 carrying two coils that can be used as part of the tunable resonators 12, 22 (FIG. 1) is shown. The structure 40 includes a band 42 or a disc having a first coil (illustratively 25 in FIG. 1) comprised of N2 windings of a continuous, electrically isolated conductor 44 disposed on an outer surface 42a of the band 42. The structure 40 also includes a second coil (illustratively 24 in FIG. 1) comprised of N1 windings (where N2>>N1) of a continuous, electrically isolated conductor 46 disposed on an inner surface 42b of the band 42. This structure 40 permits, e.g., tunable resonator 22 (FIG. 1) having the first coil 25 disposed on the outer surface 42a of the band 42 to at least partially shield the second coil 24 from a field produced by other coils that might couple to the structure 40, such as coil 15 from tunable resonators 12 (FIG. 1) while permitting such a field to couple to coil 25 of the structure 40.

The tunable receiver resonator 22 receives energy via inductive coupling from the tunable transmitter resonator 12 and the tunable receiver resonator 22 inductively couples that energy to the coil 24. An output voltage at the coil proportional to the ratio N1/N2 is produced. This voltage is much lower than the voltage induced across coil 25 from tunable resonator 12. This lower AC voltage at the coil 24 is rectified by a full wave rectifier 33 to produce a DC voltage. The capacitor 30 smoothes/filters this DC voltage and the DC/DC converter 32, converts the DC voltage to a desired value according to input voltage requirements of a subsequent device such as a load 34. As the load 34 draws current from the DC/DC converter circuit 32, the voltage at the output of the coil 25 does not drop, but causes the DC/DC converter to increase current drawn through the coil 25. The separately tunable resonators for both transmission and reception increase the operating range of the arrangement and improve the manufacturability of the arrangement in comparison to self-resonator coils that rely in intrinsic coil capacitance. The inclusion of a variable capacitor permits precise tuning and thus selection of the resonant frequency of the resonator. The inclusion of the secondary coils 14, 24 for transmission and reception respectively, reduces the voltage requirement at the RF source 16, as well as the voltage requirements of the processing circuits, e.g., capacitor 30, rectifier 33 and DC/DC converter 32 at the receiver.

Because the power output is connected to the coil 24 having a low number of windings N2, the ratio between output voltage and resonator voltage is controlled by the ratio of the number of windings of the two coils, as:

$$VL_{(coil)} = V_{in} * Q * N2/N1$$

Where Q is the quality factor of the resonator and N2 and N1 are respectively the number of windings for the coils 25 and 24. For example, if Q=10, N1=100 and N2=10, the coil voltage will be the same as the input voltage, convenient to rectify and regulate. Another advantage of this arrangement is the ability to tune transmitter and receiver resonators 12, 22 separately to the oscillator/driver RF power source frequency rather than tuning the source to the resonator. This can enable tuning multiple receivers separately while powered by a single transmitter. Tuning can be performed manually with a variable capacitor, or automatically using a voltage-controlled capacitor, such as reverse-biased semiconductor junction. In an example, tunable AM-radio antenna resonators usable in a range of 550 kHz to 1600 kHz are used for the coil arrangement of FIG. 1. The transmitter coil is powered by an RF oscillator set at 1 MHz sinusoidal signal via lOW Power Amplifier driver. The receiver coil can be displaced, e.g., 24" away. The two resonators are tuned to the oscillator frequency and feature Q-factors of 10 each.

Figure 3:
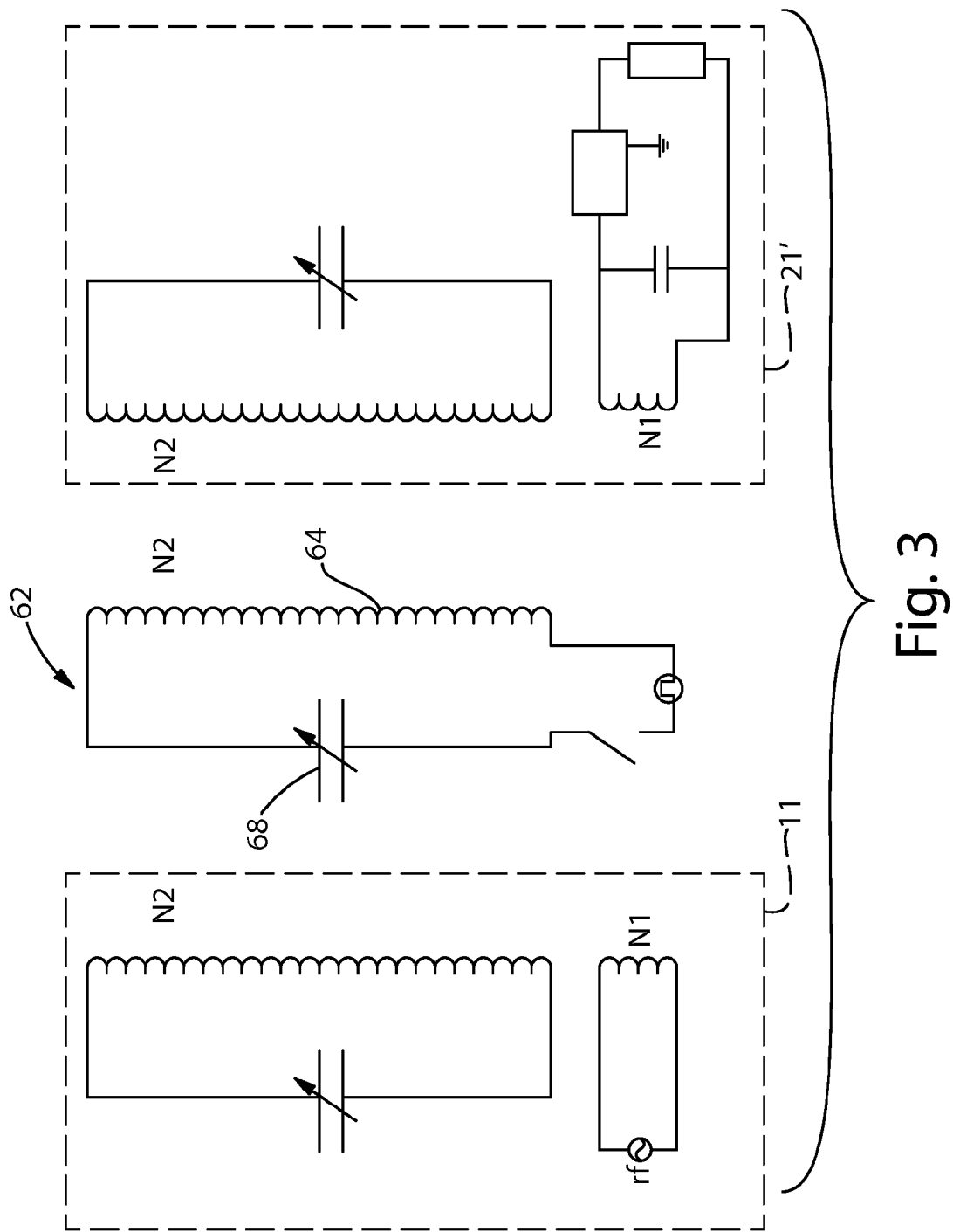
FIG. 3 is a schematic of an inductive power link employing separately tunable transmitter/receiver coils and an intermediate passive resonator.

Referring now to FIG. 3, an alternative enhancement uses a tunable passive resonator 62 comprising coil 64 and variable capacitor 68 with the resonator 62 disposed between the transmitter 11 of FIG. 1, and a receiver 21' similar to that of receiver 21 of FIG. 1 without the rectifier circuit. Here the tunable passive resonator 62 boosts received power and range by tuning the passive resonator 62 around the resonant frequency and providing phase control to bias a waveform on the receiver 11' side to effectively rectify the RF signal coupled to the receiver 11'. The tunable passive resonator 62 enables resonant wireless power transfer systems to operate in the high radio frequency range and provide AC to DC power conversion without a rectifier circuit. The technique is applicable to alternating current to direct current conversion, as well as RF to DC (radio frequency to direct current) conversion using resonant circuits for transmission, conditioning and reception of wireless power.

The resonator 62 is a LC tank circuit with resonant frequency f, driven by rectangular pulse oscillator and a power switch or amplifier. A passive LC repeater is tuned to the first harmonic 2f of the resonant frequency f. The two frequencies are mixed in the receiver to produce an essentially asymmetrical DC component in the output without a rectifier circuit. DC power is produced from AC source by mixing the two signals f and 2f to produce a signal having a sum output voltage along with a DC component. The two voltages with different frequency can be produced from the same AC or RF power source, using the base frequency f and the first harmonic 2f.

Figures 4A, 4B:
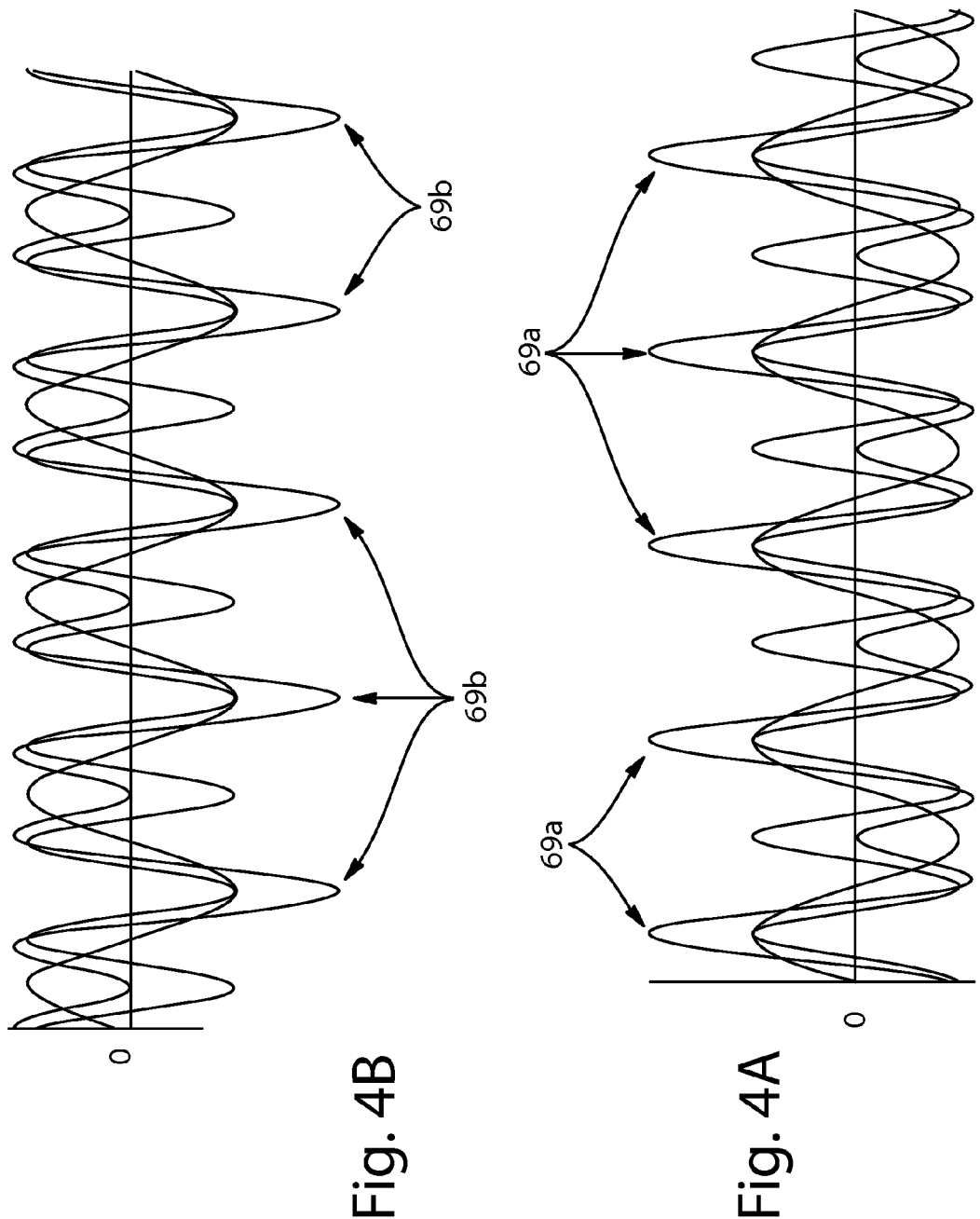
FIGS. 4A and 4B are diagrammatical illustrations of an effect that can be produced by the arrangement of FIG. 3.
Figure 5:
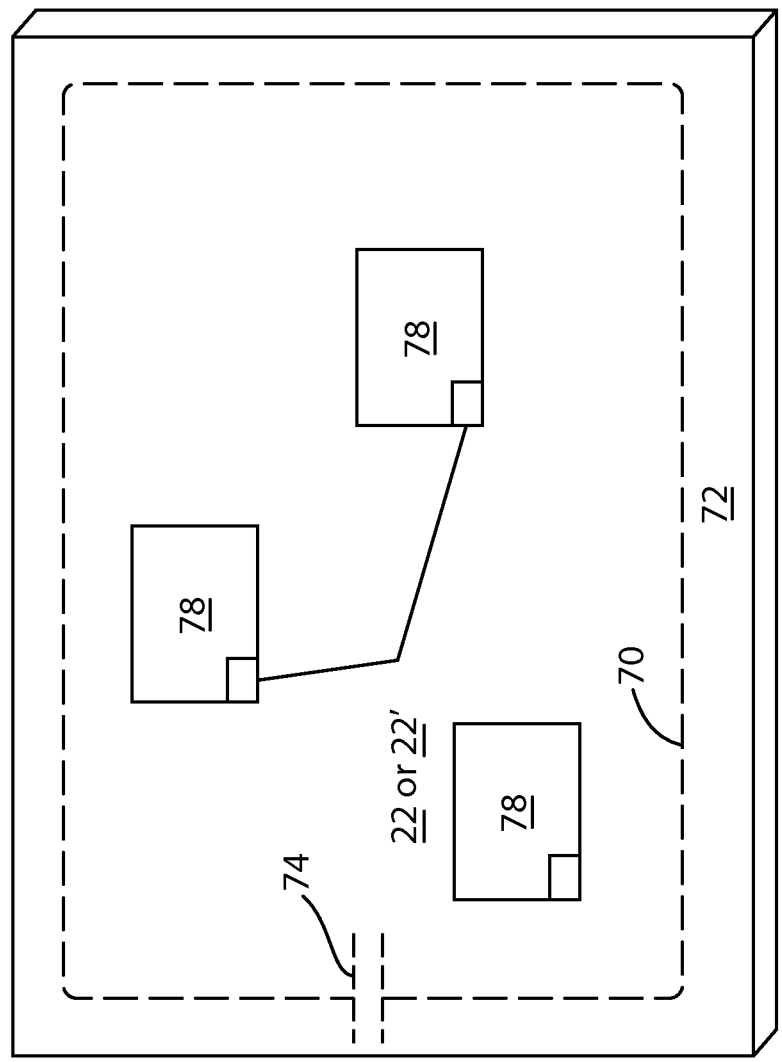
FIG. 5 is diagram of a charging arrangement.

By controlling the phase shift between the two voltages, a higher amplitude positive or negative DC component can be produced at the output. Signals at the two frequencies are mixed at the power source or transmitted separately and mixed at the receiver. By using resonant circuits for transmitter and receiver, amplification of the output voltage can be achieved. That is, by mixing the two sinusoidal waveforms, f and 2f (as illustrated in FIGS. 4A, 4B) an asymmetrical waveform with a DC component is produced. For example, mixing a frequency f with the first harmonic 2f with equal amplitudes can produce a sum with positive (FIG. 4A) or negative (FIG. 4B) high-amplitude, half-waves, depending on the phase shift between the two voltages. For instance, in FIG. 4A, a 270° phase shift between the two source voltages results in positive peaks 69a whereas in FIG. 4B a 90° phase shift between the two source voltages results in negative peaks 69b. Either the preponderance of the positive or negative peaks 69a, 69b can be used to directly charge a battery without the user of traditional rectifier and filter circuitry. Referring now to FIG. 5, in a practical application, a single-wire transmitter conductor 70 forms a loop disposed about a periphery of a structure such as a table 72, as shown. The transmitter inductor 70 (corresponding to coil 15 in FIG. 1) is coupled in parallel with a tuning capacitor 74 (corresponding to capacitor 18 in FIG. 1) at two ends of the conductor. The receiver can be positioned within the area enclosed by the conductor 72 and about 1 m up or down from the surface of the table 72. Such a single wire loop is fed via an RF source, (not shown) as discussed above, and could deliver power over a relatively large area providing sufficient power for charging of low-rate intermittent-usage devices 78, such as household care appliances, e.g., cell phones, electric shavers, electric toothbrushes, etc. or other appliances with low average charging rate.

This arrangement permits RF transmission that can charge multiple devices (and the emissions can be under acceptable limits, such as those established by for example the International Commission on Non-Ionizing Radiation Protection). With this arrangement, e.g., around 100 mW each (typically 30 mW needed) could be received by multiple devices over several cubic meters of space and resonant repeaters enhance power for small devices. In this arrangement the loop around the table provides a large surface area where devices having tunable receiver resonators (22 or 22') can be positioned freely.

A number of embodiments of the invention have been described. Nevertheless, it will be understood that various modifications may be made without departing from the spirit and scope of the invention. For example, instead of the passive resonator a magnetic field transmitter operating at the first harmonic or higher harmonic of the base transmitter frequency can be used to provide effective rectification, as discussed above. Accordingly, other embodiments are within the scope of the following claims.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for wireless energy transfer, the system comprises:
   a resonator circuit for wireless transmission of energy, the resonator circuit comprising:
   a transmitter coil having a large number of windings N1;
   a variable capacitance device connected in shunt across the transmitter coil with the transmitter coil and the variable capacitor and intrinsic capacitance of the transmitter coil forming the resonator circuit; and
   an input coil configured to be coupled to an input RF source, with the input coil having a low number of windings N2 compared to the number of windings N1 of the transmitter coil, and the input coil being inductively coupled to the transmitter coil to provide power output from the circuit with the resonator circuit having a resonant frequency in a range of about 100 kHz to 30 MHz; and
   a circuit inductively coupled to the resonator circuit to effectively produce a rectified voltage having a DC component, wherein the circuit inductively coupled to the resonator circuit comprises at least one of:
   (i) a tunable passive resonator tuned to a harmonic of the resonant frequency or (ii) a magnetic field transmitter operating at the first harmonic or higher harmonic of the base transmitter frequency.

2. The system of claim 1 wherein the resonator circuit is tuned by the variable capacitance device.

3. The system of claim 1 wherein the resonator circuit oscillates at high voltage and produces a strong magnetic field at the transmitter coil.

4. The system of claim 1 further comprising an RF source connected to the input coil.

5. The system of claim 1 wherein inductive coupling of the transmitter and input coils produces an output voltage at the transmitter coil related to $V_{L(coil)} = V_{in} * Q * N2/N$ where $V_{in}$ is related to the voltage of the RF source connected to the input coil.

6. The system of claim 1 wherein the tunable passive resonator is configured to be driven by a rectangular pulse oscillator.

7. A system for wireless energy transfer, the system comprises:
   a circuit for wireless transmission of energy, the circuit comprises:
   a first resonator circuit comprising:
   a transmitter coil having a large number of windings N1;
   a variable capacitance device connected in shunt across the transmitter coil with the transmitter coil and the variable capacitor and intrinsic capacitance of the transmitter coil forming the first resonator circuit; and
   an input coil configured to be connected to an input RF source, with the input coil having a low number of windings N2 compared to the number of windings N1 of the transmitter coil, and the input coil being inductively coupled to the transmitter coil to provide power output from the first resonator circuit at a resonant frequency in a range of about 100 kHz to 30 MHz; and
   a circuit inductively coupled to the first resonator circuit to effectively produce a rectified voltage having a DC component, wherein the circuit inductively coupled to the first resonator circuit comprises at least one of:
   (i) a tunable passive resonator tuned to a harmonic of the resonant frequency or (ii) a magnetic field transmitter operating at the first harmonic or higher harmonic of the base transmitter frequency.

8. A system for wireless energy transfer, the system comprises:
- a table;
- a circuit embedded in the table for wireless transmission of energy, the circuit comprises:
- a first resonator circuit comprising:
- a transmitter conductor; and
- a variable capacitance device connected in shunt across the transmitter conductor with the transmitter coil and the variable capacitor and intrinsic capacitance of the transmitter coil forming the first resonator circuit, wherein the first resonator circuit is tuned to a resonant frequency of an RF source; and
- a circuit inductively coupled to the first resonator circuit to effectively produce a rectified voltage having a DC component, wherein the circuit inductively coupled to the first resonator circuit comprises at least one of:
- (i) a tunable passive resonator tuned to a harmonic of the resonant frequency or (ii) a magnetic field transmitter operating at the first harmonic or higher harmonic of the base transmitter frequency.

9. The system of claim 8 wherein the RF source is an input RF source, wherein the transmitter conductor is coupled to the input RF source to provide power output from the first resonator circuit at a resonant frequency in a range of about 100 kHz to 30 MHz.

* * * * *